United States Patent [19]
Tobita

[11] Patent Number: 5,136,564
[45] Date of Patent: Aug. 4, 1992

[54] PIT PATTERN DETECTING APPARATUS AND METHOD

[75] Inventor: Minoru Tobita, Tokyo, Japan

[73] Assignee: Sony Corporation, Tokyo, Japan

[21] Appl. No.: 510,826

[22] Filed: Apr. 18, 1990

[30] Foreign Application Priority Data

May 24, 1989 [JP] Japan .................. 1-128695

[51] Int. Cl.⁵ .............................................. G11B 7/00
[52] U.S. Cl. ..................... 369/44.13; 369/44.26; 369/44.28; 369/32; 369/44.34
[58] Field of Search ............ 369/54, 58, 44.13, 44.26, 369/44.25, 32, 44.28, 44.34, 47, 48, 109, 124, 275.3, 275.4

[56] References Cited

U.S. PATENT DOCUMENTS

| | | | |
|---|---|---|---|
| 4,068,269 | 10/1978 | Commander et al. | 360/78 |
| 4,914,645 | 4/1990 | Getrewer | 369/44 |
| 4,933,922 | 6/1990 | Yokogawa | 369/44.11 |
| 4,937,800 | 6/1990 | Oldham | 369/13 |

FOREIGN PATENT DOCUMENTS

A1278006 8/1988 European Pat. Off. .
A2344669 12/1989 European Pat. Off. .
A2348949 1/1990 European Pat. Off. .

Primary Examiner—Roy N. Envall, Jr.
Assistant Examiner—Robert Chevalier
Attorney, Agent, or Firm—Alvin Sinderbrand; William S. Frommer

[57] ABSTRACT

A recording and/or reproducing apparatus includes a detection unit for detecting the presence of a tracking error detection pit pattern or a sector mark in a signal reproduced by an optical head frrom an optical record disk, on which tracking error detecting pits or sector mark detecting pits are recorded with a predetermined offset with respect to the center of the recording track. The detection unit is adapted for detecting the tracking error detecting pit pattern or the sector mark detecting pit pattern on the basis of a characteristic bit data pattern and a characteristic amplitude pattern in the signal reproduced from the record disk.

13 Claims, 8 Drawing Sheets

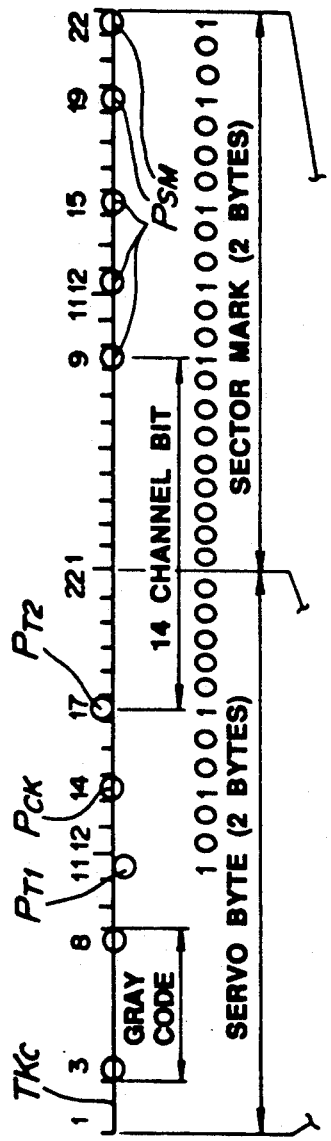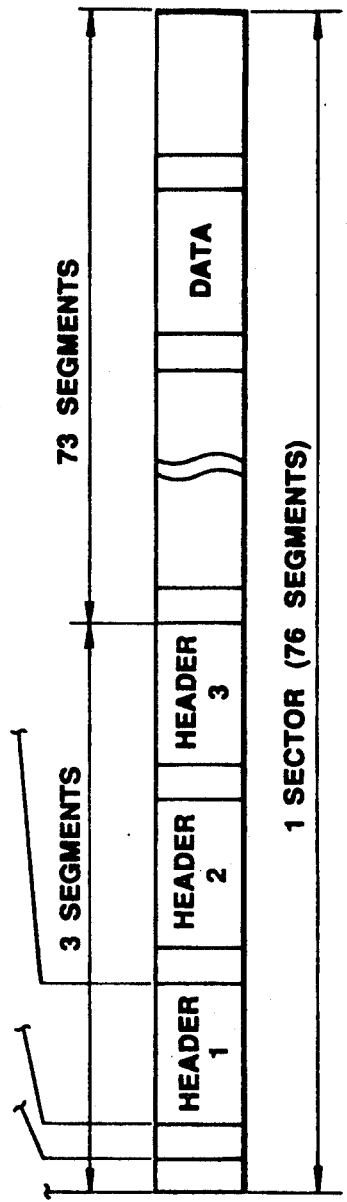
FIG. 1a  FIG. 1b  FIG. 1c

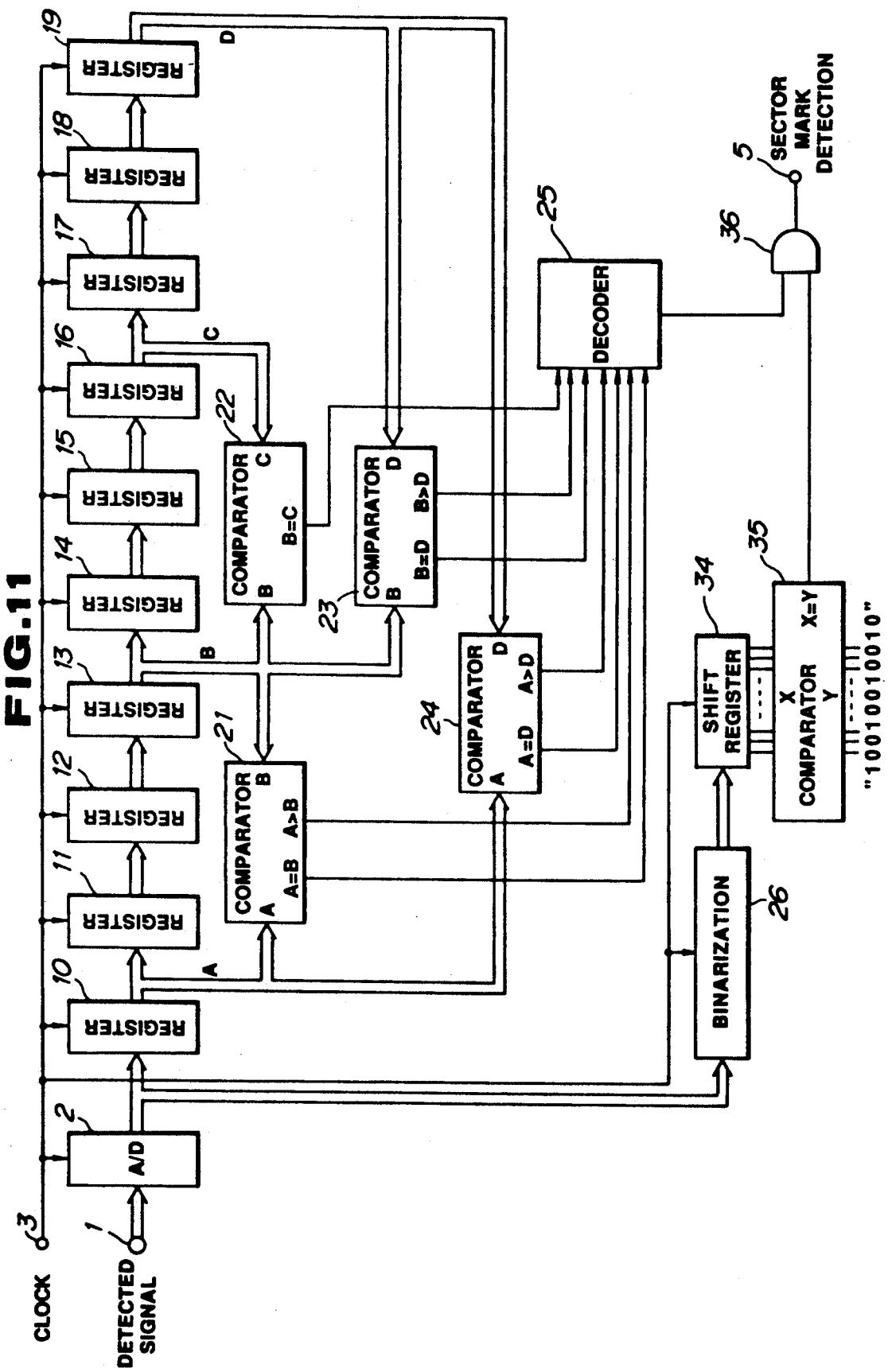

PIT PATTERN DETECTING APPARATUS AND METHOD

BACKGROUND OF THE INVENTION

1. Field of the Invention

This invention relates to a method for detecting pit patterns on a disk-shaped recording medium of a sampled servo system.

2. Description of the Prior Art

For a conventional disk-shaped recording medium, including an optical disk or a magneto-optical disk, such as, for example, a 3.5-inch magneto-optical disk, there has been proposed a recording format as shown for example in FIG. 1. For this recording format, a so-called 4-11 modulation system is employed, according to which one byte or 8-bits of data are recorded by an 11 channel bit pit pattern.

Referring to FIG. 1a, there is shown a 22 channel bit sector mark, corresponding to 2-bytes of data, after a 22 channel pit servo byte corresponding similarly to 2 bytes of data, at the leading position of one sector. This is a pit pattern appearing at the leading portion of each sector, as will be described in more detail later. Referring to FIG. 1a, a servo byte comprises gray code pits, tracking pits $P_{T1}$, $P_{T2}$, "wobbled" with respect to a track center $T_{kc}$, and a clock pit $P_{CK}$, while a sector mark comprises sector mark pits $P_{SM}$ located 14 channel pits after the tracking pit $P_{T2}$ of the servo byte.

As shown in FIG. 1b, the 2-byte servo byte and the 2-byte sector mark comprise a segment along with track and sector numbers, such as most significant bits and least significant bits. The sector mark, track numbers and the sector numbers make up 8 bytes. Meanwhile, as shown in FIG. 1c, each sector comprises 76 segments, of which the leading three segments are headers 1 to 3 and the remaining 73 segments are data. The segment shown in FIG. 1b is located at the foremost segment of the sector, that is at header 1, as shown in FIG. 1c.

This sector is organized as shown in FIG. 2, in which the header region is formed by six rows. Segment 1 of the header region comprises the 2-byte servo byte and a 2 rows×4 byte identification label ID including 2-byte sector mark. Segment 2 comprises the servo byte and the preamble/ALPC. Segment 3 comprises the servo byte and the preamble. The data region comprises servo bytes and 2 rows×3 bytes of data in 130 rows. Segment 68 includes 2 bytes of control data and cyclic redundancy check (CRC) data. The error correcting code (ECC) region comprises servo bytes and 2 rows×4 bytes of ECC data in 16 rows.

The two pits of the gray code of the servo bytes are recorded at a period of 16 tracks, as shown for example in FIG. 3.

In a 3.5 inch magneto-optical disk, on which data are recorded in accordance with the above mentioned 4-11 modulation system, the bit data obtained upon reading the sector mark pits $P_{SM}$ are "10010010001001". To distinguish the format pits from data pits recorded on the disk, the data pits are recorded using a pattern not usually found in the data region.

The circuit to detecting the pit pattern of the sector mark shown in FIG. 4 is employed. Referring to FIG. 4 reproduced signals read, for example, from a magneto-optical disk as the disk-shaped recording medium are input to an input terminal 101. The reproduced signal is differentiated by a differentiating circuit 102 and processed in a comparator 103 so as to be converted at a predetermined threshold level into a rectangular wave signal which is transmitted to a shift register 104. A sync signal and a reference clock signal are transmitted to the shift register 104 via input terminals 105 and 109, respectively, so that a signal Z produced by synchronization by the sync signal and shifting from the rectangular wave signal on the basis of the reference clock is transmitted to a comparator 106. A bit data pattern W of "10010010001001" is supplied to the comparator 106 via input terminal 107. A sector mark detection signal is output via output terminal 108 when Z=W="10010010001001".

Referring to FIG. 1a, the servo byte and the sector mark are adjacent in the above format, and a pattern consisting of 14 bit intervals or 13 "0" bits between the servo bytes and the sector marks, that is, a unique pattern, is formed. By detecting the unique pattern, the servo byte may be detected once for each sector. The unique pattern can be detected by a circuit similar to that of FIG. 4 when the data to be compared in the comparator 106 is the bit data pattern "10000000000001".

In general, when the data recorded on a disk is modulated, the capacity that may be recorded on a disk is less than in the case of unmodulated data. However, without modulation there is a risk that the pits of the same pattern as the sector mark may be found in the data region. In such case, the sector mark pattern cannot be detected accurately.

Although there is one servo byte per segment as shown in FIG. 1c, the unique pattern between the servo byte and the sector mark which is not found in the 4-11 modulation system data region appears only once in each sector. Therefore, if the phase locked loop (PLL) which performs capturing by detecting the clock pit $P_{CK}$ of the servo byte during disk reproduction, that is, reading should be disengaged, re-capturing is not feasible until after passage of one or more sectors.

OBJECT AND SUMMARY OF THE INVENTION

It is an object of the present invention to provide a method for detecting a pit pattern whereby servo bytes or sector marks may be detected reliably when reproducing a record disk on which data were recorded without modulation.

In the method for detecting the presence of a pit pattern according to the present invention, predetermined pits to be detected are recorded with a predetermined radial offset from the track center and a predetermined linear spacing between pits; and the pits are detected on the basis of a characteristic bit data pattern and a characteristic amplitude pattern in the signal reproduced from the record disk.

The above mentioned predetermined pit pattern may represent the tracking error detecting servo byte or the sector mark. The pit pattern may be detected for each servo byte in a segment, so that capturing by the PLL may be achieved more expeditiously.

BRIEF DESCRIPTION OF THE DRAWINGS

FIGS. 1a, 1b and 1c show pit and block formats on a disk.

FIG. 11 is a circuit diagram showing a detection circuit for sector mark pit pattern detection.

DESCRIPTION OF THE PREFERRED EMBODIMENT

By referring to the accompanying drawings, a preferred embodiment of the present invention will be explained in detail.

The optical disk employed in the following embodiment is an optical disk on which data have been recorded without modulation for increasing the recording capacity. In the present embodiment, an optical disk of, for example, the read only memory (ROM) type on which data are directly recorded as, for example, non-return-to-zero (NRZ) signals without modulation, is to be reproduced.

Figure 5:
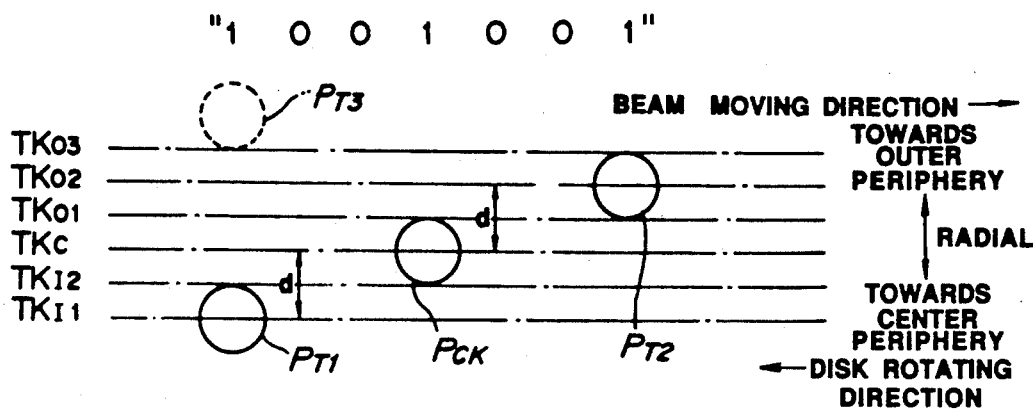
FIG. 5 is a view of a record disk recording track containing pits offset a predetermined distance with respect to the center of the track, and showing sample laser paths when the pit pattern represents a tracking error detecting servo byte.

FIG. 5 shows an example in which a predetermined pit pattern to be detected is applied to tracking error detecting servo byte pits.

Referring to FIG. 5, a clock pit $P_{CK}$ is formed on a track center $T_{kc}$, while a tracking pit $P_{T1}$ is formed at a temporally preceding position, that is, at a position previously traversed by the laser beam with rotation of the optical disk, and which is radially offset a predetermined distance d from the track center $T_{kc}$ towards the disk center and a tracking pit $P_{T2}$ is formed at a temporally succeeding position, that is at a position subsequently traversed by the laser beam, and which is offset a predetermined distance d from the track center $T_{kc}$ towards the outer periphery of the disk. The linear distance between $P_{T1}$ and $P_{CK}$ is two pit intervals, forming the pit data pattern "1001"; where a "1" is formed by a pit anywhere in the track width and a "0" is formed by the absence of a pit in the track width during the length of a pit interval. These "wobbled" tracking pits $P_{T1}$, $P_{T2}$ and clock pit $P_{ck}$ represent the bit data pattern "1001001". The pattern of the tracking pits $P_{T1}$, $P_{T2}$ and the clock pit $P_{ck}$ is read by an optical pickup device (not shown). A pit $P_{T3}$ shown in dotted lines on FIG. 5 is a servo byte pit of an adjacent track.

For accurate tracking, the laser beam from the optical pickup device must pass through or scan along the track center $T_{kc}$ in FIG. 5. However, before it is tracking accurately, the laser beam may not necessarily pass through the track center $T_{kc}$ but may pass through any arbitrary path. Assuming that the laser beam passes through any one of sample laser paths $T_{k11}$, $T_{k12}$, $T_{kc}$ (track center), $T_{k01}$, $T_{k02}$, or $T_{k03}$, the reproduced signal waveforms read by the laser beam passing through these laser paths are as shown in FIGS. 6a to 6f.

Figure 6:
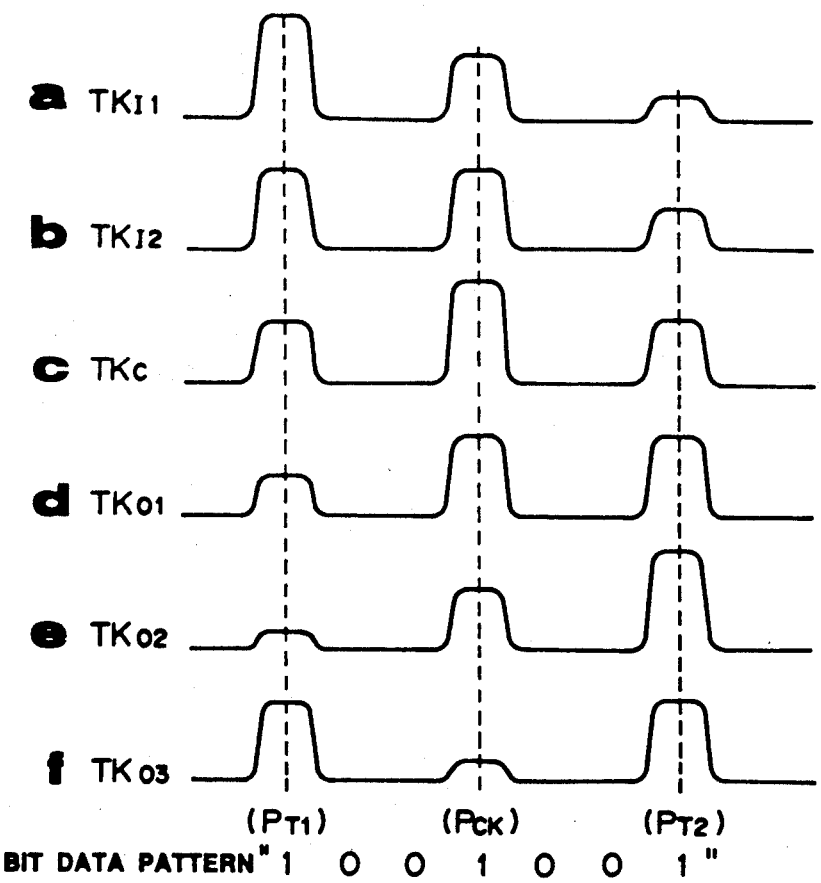
FIG. 6 consisting of FIGS. (6a)-(6f) is a waveform diagram showing the reproduced signal waveform for each sample laser path in FIG. 5.

That is, FIG. 6a shows a reproduced signal waveform when the laser beam passes through the laser path $T_{k11}$. In this waveform, the pulse or peak corresponding to the track pit $P_{T1}$ has a large amplitude because the pit is at the center of the pickup's beam, that of the clock pit $P_{ck}$ has a medium amplitude because the pit is not at the center of the beam and that of the tracking pit $P_{T2}$ has a small amplitude because the pit is at the edge of the beam. In FIG. 6b when the laser beam passes through the laser path $T_{k12}$, the pulse or peak corresponding to the tracking pit $P_{T1}$ has an amplitude approximately equal to that of the clock pit $P_{ck}$, while the pulse or peak corresponding to the tracking pit $P_{T2}$ has a smaller amplitude. In FIG. 6c when the laser beam passes through the laser path $T_{kc}$, the pulse or peak corresponding to the clock pit $P_{ck}$ has an amplitude larger than that of the peaks corresponding to tracking pits $P_{T1}$ and $P_{T2}$, and which are approximately equal to each other. In FIG. 6d when the laser beam passes through the laser path $T_{k01}$, the pulse or peak corresponding to $P_{CK}$ has an amplitude approximately equal to that of $P_{T2}$ while the peak corresponding to $P_{T1}$ has a smaller amplitude. In FIG. 6e when the laser beam passes through the laser path $T_{k02}$, the peak corresponding to the track pit $P_{T2}$ has a large amplitude, that of the clock pit $P_{CK}$ has a medium amplitude and that of the tracking pit $P_{T1}$ has a smaller amplitude. In FIG. 6f when the laser beam passes through the laser path $T_{k03}$, the laser beam also reads the tracking pit $P_{T3}$ of the servo byte of the adjacent track. In this case, the pulse or peak corresponding to the track pit $P_{T3}$ has an amplitude approximately equal to the amplitude of the track pit $P_{T2}$, While the peak corresponding to the track pit $P_{CK}$ has a smaller amplitude. In each servo byte waveform, at least one peak is of small or medium, amplitude, and there are three peaks per waveform. Confusion with the data byte waveform does not occur, because its peaks are equal and of high amplitude. The operation of pit pattern detection will be explained with reference to the functional block diagram of FIG. 7.

Figure 2:
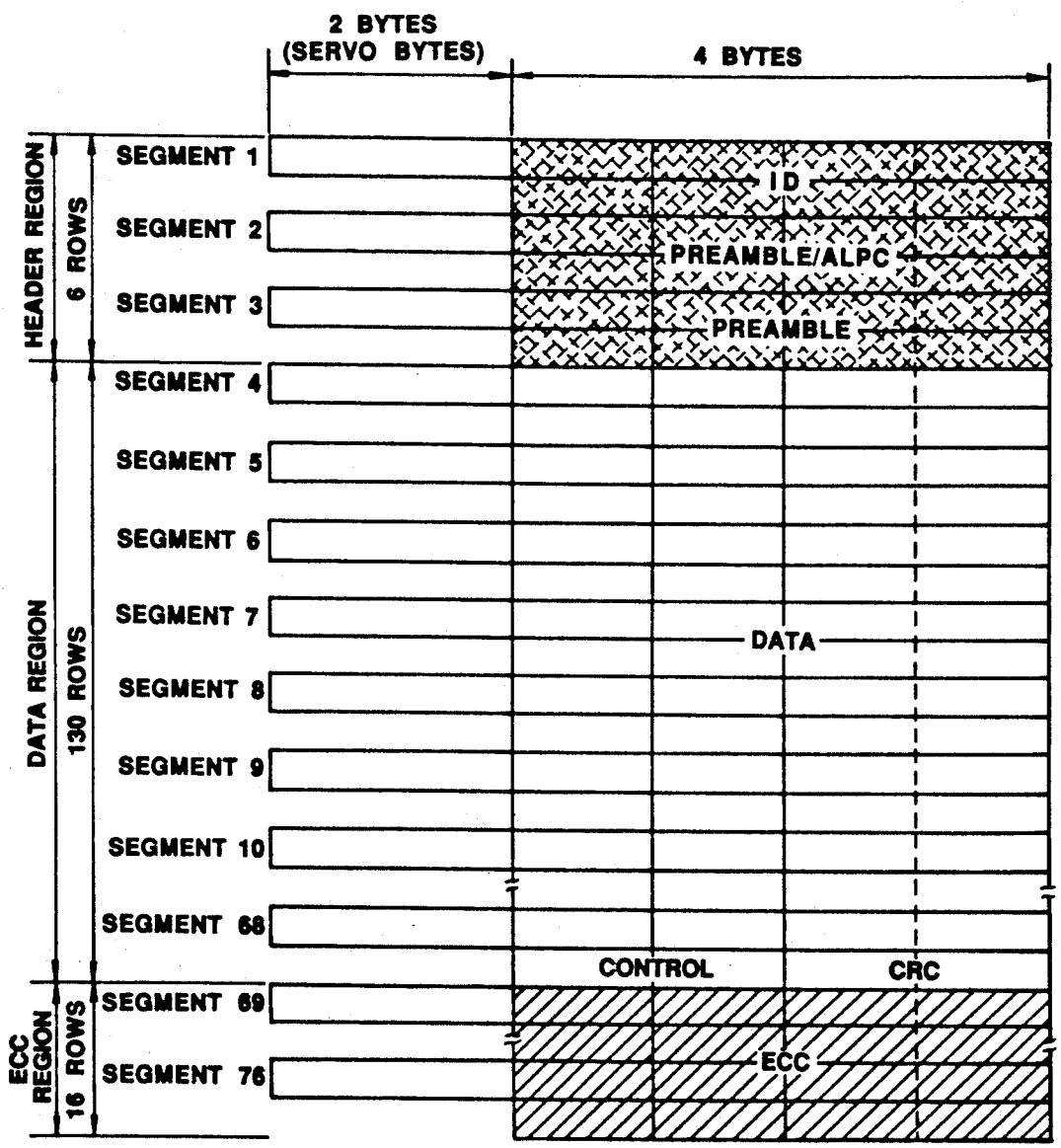
FIG. 2 shows a detailed block format of a sector.
Figure 3:
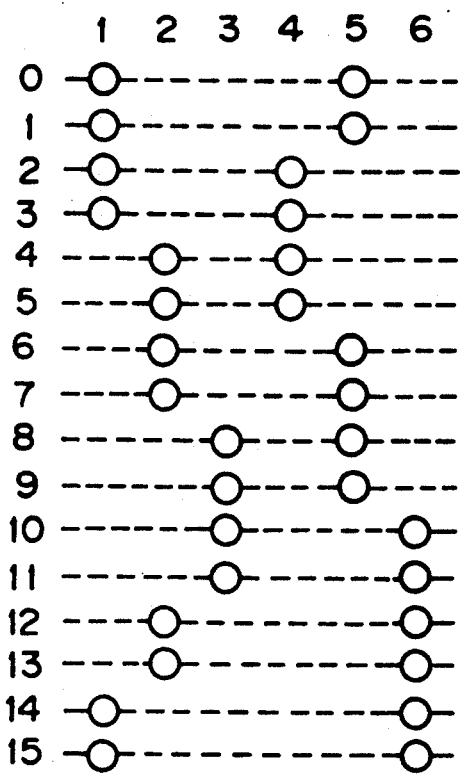
FIG. 3 is an enlarged partial view of a disk showing gray code pits for 16 consecutive tracks.
Figure 7:
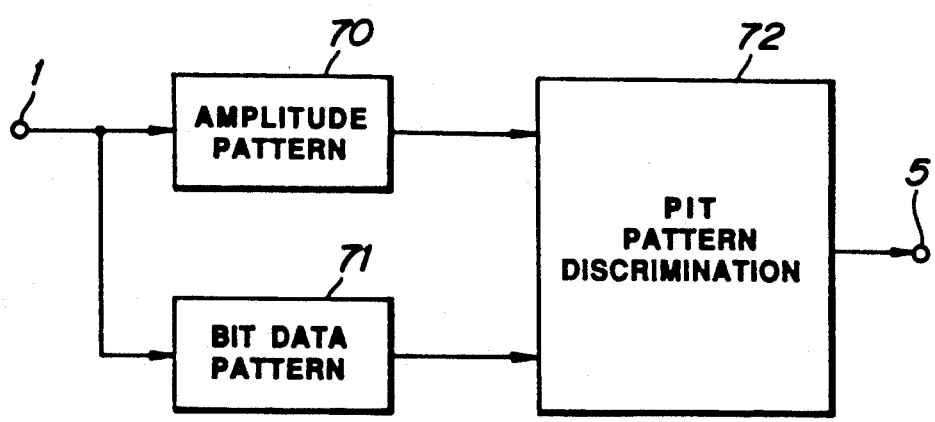
FIG. 7 is a functional block diagram showing a basic arrangement for pit pattern detection.
Figure 4:
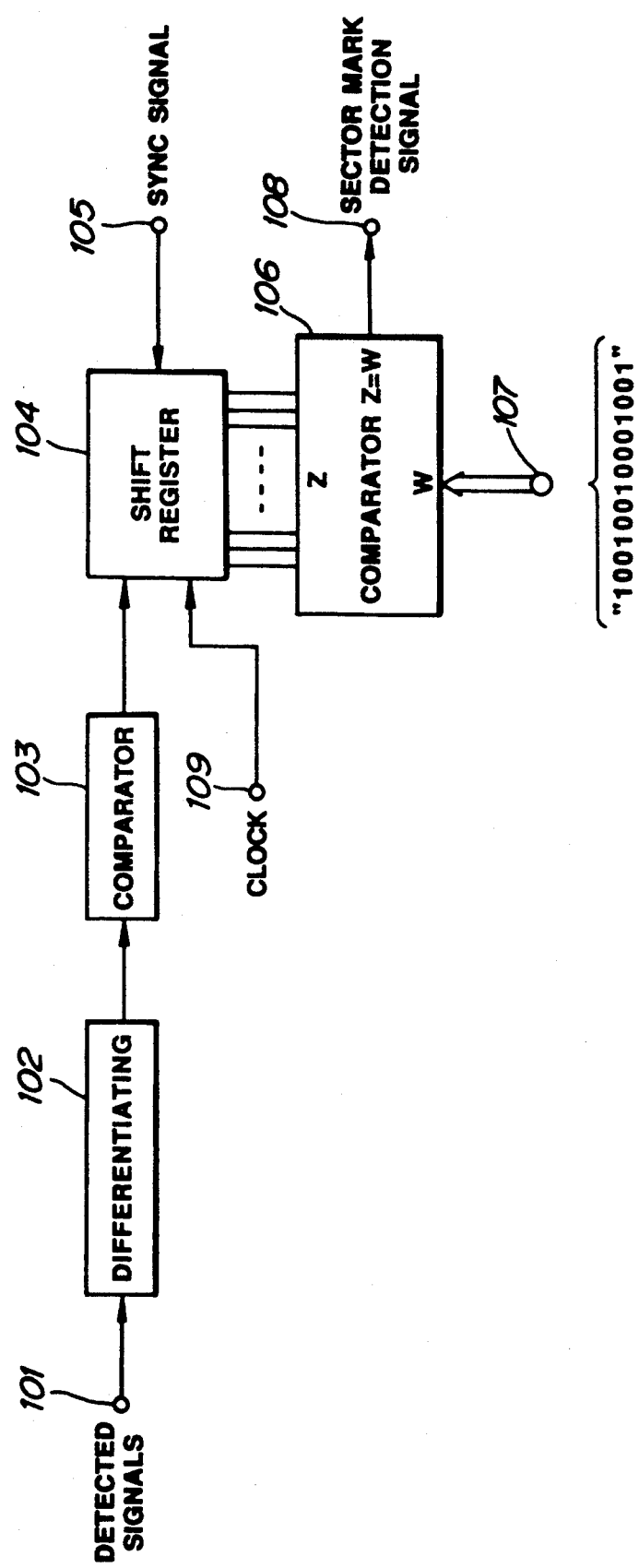
FIG. 4 is a circuit diagram showing a conventional pit pattern detection circuit

In FIG. 7, the above mentioned reproduced signals are supplied from the usual pick up (not shown) to the input terminal 1 and thence to an amplitude pattern detection block 70 and to a bit data pattern detection block 71. In the amplitude pattern detection block 70, amplitude data of the reproduced signal waveforms are taken out and compared to one another and, when any one of these signal waveforms matches any one of the characteristic amplitude patterns shown in FIGS. 6a to 6f, a signal indicating that such characteristic amplitude pattern has been detected is transmitted to a pit pattern discrimination block 72. Simultaneously, in the pit data pattern detection block 71, bit data are taken out from the reproduced signal and the bit data pattern of the reproduced signal is compared with the servo byte bit data pattern ("1001001"). When the bit data pattern of the reproduced signal matches the servo byte bit data pattern, the detection block 71 transmits a signal indicating that the servo byte bit data pattern has been detected to the pit pattern discrimination block 72. That is, when the outputs of block 70 and of block 71 are simultaneously supplied to block 72, block 72 can determine that the pit pattern of the reproduced signal represents the tracking servo byte pit pattern. If the data pattern "1001001" occurs in the reproduced data per se, such data pattern is presented with its pulses or peaks being of equal high amplitude and is not detected at the amplitude pattern detection block 70, so that it is not confused with the tracking servo byte hit pattern shown in FIG. 5.

A typical circuit for detecting the pit pattern by means of the pit pattern detecting method described above is shown in FIG. 8.

Figure 8:
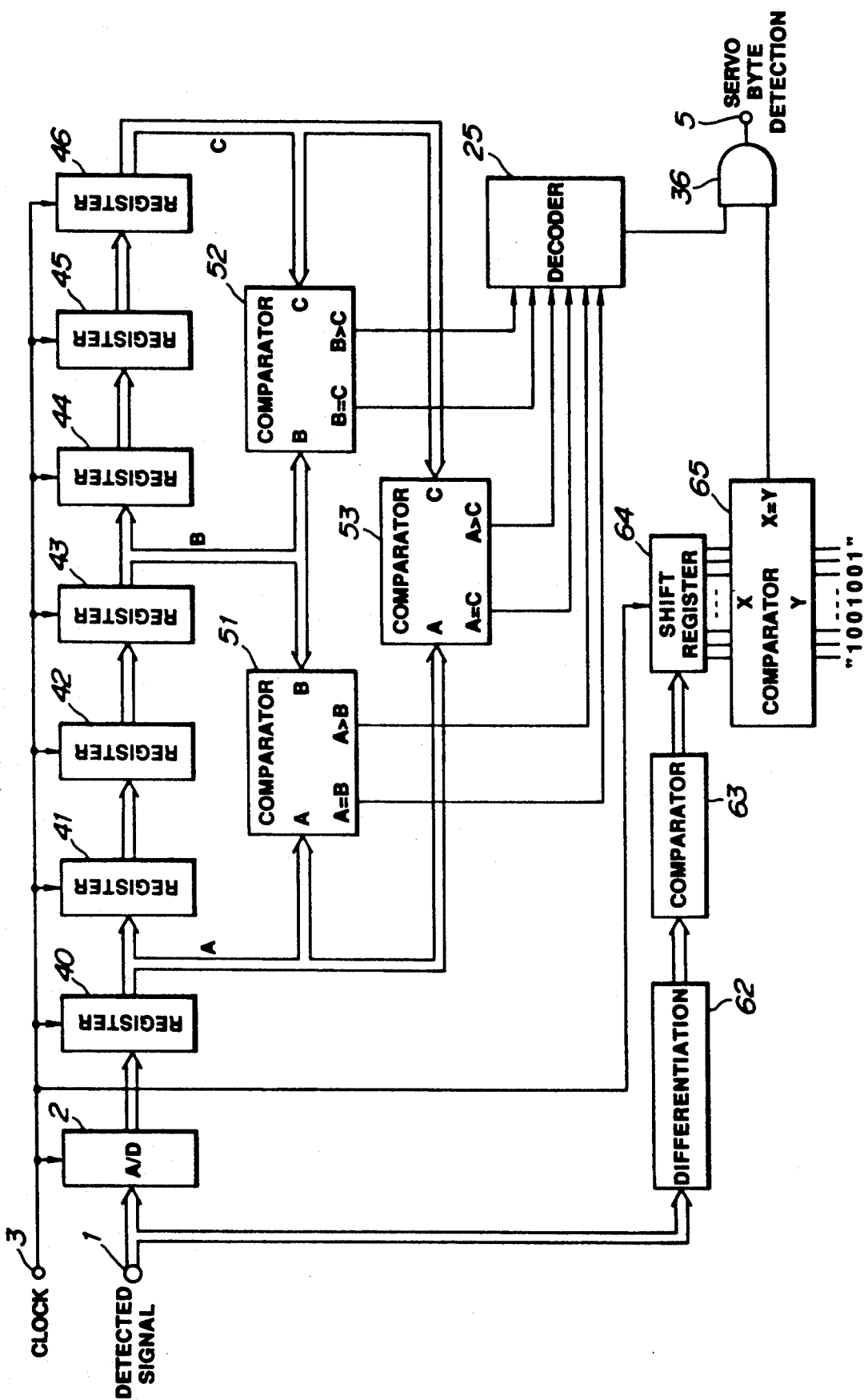
FIG. 8 is a circuit diagram showing a detection circuit for servo byte pit pattern detection.

In FIG. 8, a reproduced signal read by the optical pickup device from the optical disk is input to an input terminal 1. This reproduced signal is converted by an A/D converter 2 into digital wave height data which are sequentially transmitted to registers 40 to 46. To each of these registers 40 to 46, there are supplied from an input terminal 3 reference clocks which serve not only as bit clocks but also as channel clocks. Based on these reference clocks, the registers 40 to 46 take out amplitude data of the waveforms of the above mentioned reproduced signals. Amplitude data A taken out from register 40 and amplitude data B taken out from register 43 are transmitted to a comparator 51, whereas the amplitude data B from register 43 and amplitude data C from register 46 are transmitted to a comparator 52 and the amplitude data A from register 40 and the amplitude data C from register 46 are transmitted to a comparator 53. The comparator 51 compares the amplitudes A and B to transmit a predetermined signal, such as a high signal "H", to a decoder 25, when the result of such comparison is A=B or A>B, whereas comparators 52 and 53 transmit a predetermined signal, such as a high level signal "H", to the decoder 25 when the result of the comparison of the amplitude data B and C is B=C or B>C and when the result of the comparison of the amplitude data A and C is A=C or A>C, respectively. The decoder 25 then transmits a signal, such as a high level signal "H", based on the comparison outputs from comparators 51 to 53, to an input terminal of AND gate 36.

The reproduced signal is also differentiated by a differentiator 62 and then compared by a comparator 63 with a predetermined threshold level so as to be converted into a rectangular wave signal which is then transmitted to a shift register 64. This shift register 64 is supplied from input terminal 3 with a reference clock, on the basis of which a signal X shifted from the rectangular signal is generated and transmitted to a comparator 65. This comparator is supplied with a bit data pattern Y of "1001001". When X=Y="1001001", the comparator 65 transmits a signal, such as a "H", to another input terminal of the AND gate 36.

Therefore, when the output signal from the comparator 64 is "H" and the output signal from the decoder 25 is also "H", the AND gate 36 responds to these input signals to detect that the reproduced signal contains a pit pattern representing a tracking servo byte.

The differentiator circuit 62 and the comparator 63 may be replaced by a binary circuit 26 as will be described with reference to FIG. 11 The signal supplied to the binary circuit 26 is the output signal from the A/D converter 2.

A second embodiment in which the predetermined pit pattern to be detected is a sector mark will now be explained with reference to FIGS. 9-11.

An optical disk of, for example, a read only memory type is employed, as in the preceding embodiment, on which data are recorded as NRZ signal, for example, without modulation. When the sector mark pits are formed with wobbling with respect to the track center $T_{kc}$, several combinations may be conceived of those pits which are wobbled with respect to the track center $T_{kc}$. A combination of sector mark pits $P_{SM1}$, $P_{SM2}$, $P_{SM3}$ and $P_{SM4}$ shown in FIG. 9 is herein explained as an example.

Figure 9:
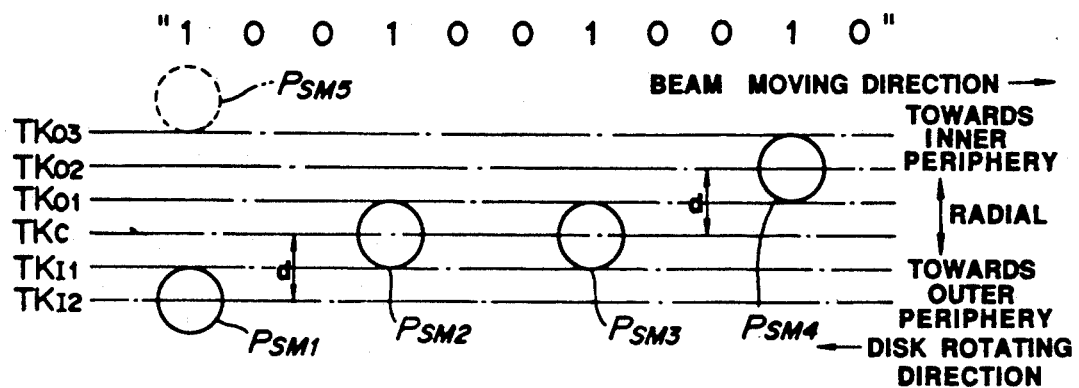
FIG. 9 is a view of a record disk recording track containing pits offset a predetermined distance with respect to the center of the track, and showing sample laser paths when the pit pattern represents a sector mark.
Figure 10:
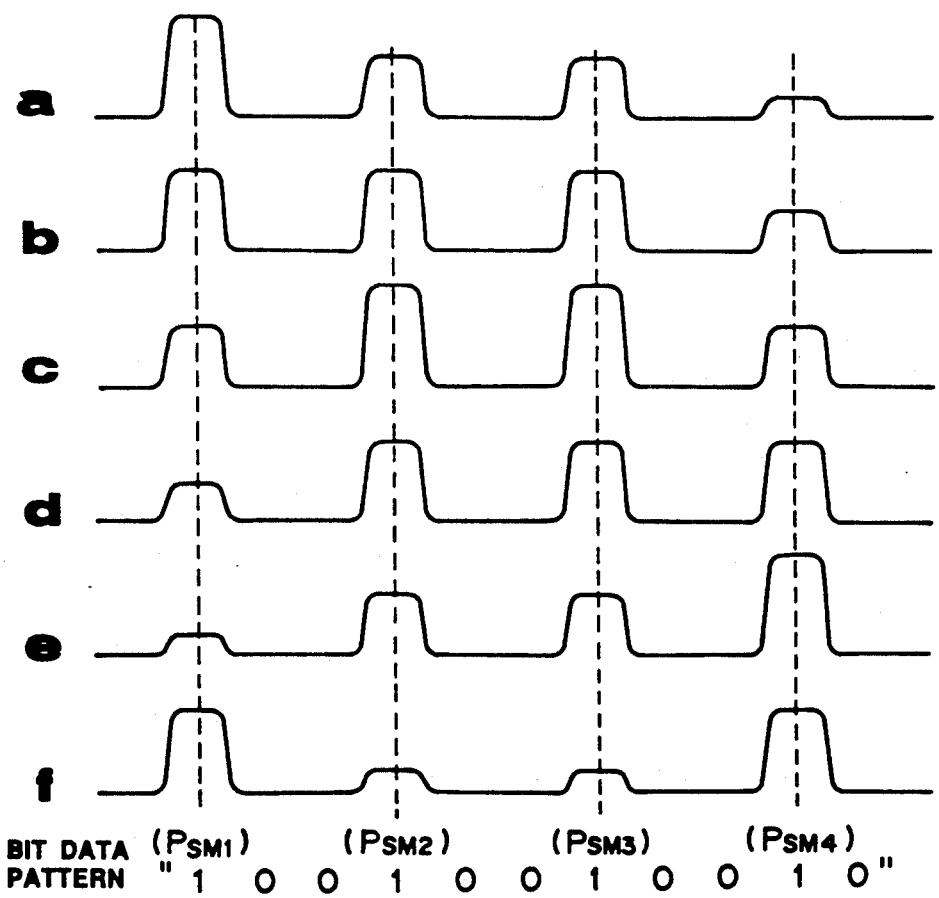
FIG. 10 consisting of FIG. (10a)-(10f) is a waveform diagram showing the reproduced signal waveform for each sample laser path in FIG. 9.

In such example of FIG. 9, sector mark pits $P_{SM2}$, $P_{SM3}$ are formed on the track center $T_{kc}$, while a sector mark pit $P_{SM1}$ is formed at a position temporally preceding the sector mark pit $P_{SM2}$, that is a position traversed by the laser beam at an earlier time point with rotation of the optical disk, which position is offset a predetermined distance d radially towards the disk center, and a sector mark pit $P_{SM4}$ is formed at a position temporally succeeding the sector mark pit $P_{SM3}$, which position is offset a predetermined distance d from the track center $T_{kc}$ towards the outer periphery of the disk. These wobbled sector mark pits $P_{SM1}$, $P_{SM2}$, $P_{SM3}$ and $P_{SM4}$ represents the bit data pattern "10010010010". A pit $P_{SM5}$ shown in dotted lines is a sector mark pit of an adjacent track.

To correctly read the sector mark, the laser beam must pass through the track center $T_{kc}$ of FIG. 9. However, the laser beam may not necessarily pass through the track center $T_{kc}$, but may pass through any arbitrary path. For example, assuming that the laser beam passes through one of sample laser paths $T_{k11}$, $T_{k12}$, $T_{kc}$ (track center), $T_{k01}$, $T_{k02}$ or $T_{k03}$, as shown in FIG. 9, the reproduced signal waveforms corresponding to these laser paths are as shown in FIGS. 10a to 10f, respectively.

FIG. 10a shows the reproduced signal waveform when the laser beam passes through laser path $T_{k12}$, FIG. 10b the reproduced signal waveform when the laser beam passes through laser path $T_{k11}$, FIG. 10c the reproduced signal waveform when the laser beam passes through laser path $T_{kc}$, FIG. 10d the reproduced signal waveform when the laser beam passes through laser path $T_{k01}$, FIG. 10e the reproduced signal waveform when the laser beam passes through laser path $T_{k02}$ and FIG. 10f the reproduced signal waveform when the laser beam passes through laser path $T_{k03}$.

For finding the sector mark, the sector mark pits $P_{SM1}$, $P_{SM2}$, $P_{SM3}$ and $P_{SM4}$ are detected on the basis of the amplitude pattern and the bit data pattern included in the reproduced signal. That is, the reproduced signal waveforms of the sector mark pits $P_{SM1}$, $P_{SM2}$, $P_{SM3}$ and $P_{SM4}$ are compared with the signal waveforms shown in FIGS. 10a to 10f corresponding to the sample laser paths $T_{k11}$, $T_{k12}$, $T_{kc}$, $T_{k01}$, $T_{k02}$ or $T_{k03}$ taken by the laser beam. In other words, the reproduced signal waveform is detected to match the sector mark waveform when it exhibits one of the amplitude patterns shown in FIGS. 10a to 10f and its bit data pattern matches the sector mark's bit data pattern "10010010010".

A bit pattern detection circuit for detecting the pit pattern according to the second embodiment is shown in FIG. 11.

In FIG. 11, a reproduced signal is input to input terminal 1 and converted by A/D converter 2 into digital wave height value data which are sequentially transmitted to registers 10 to 19. To each of registers 10 to 19, reference clocks are supplied from input terminal 3, and, on the basis of such reference clocks, amplitude data of the reproduced signal waveforms are taken out of the registers. The amplitude data A taken out at the register 10 and the amplitude data B taken out at register 13 are transmitted to a comparator 21, the amplitude data B from the register 13 and the amplitude data C from the register 16 are transmitted to a comparator 22, the amplitude data B from register 13 and the amplitude data D from the register 19 are transmitted to a comparator 23 and the amplitude data A from the register 10 and the amplitude data D from the register 19 are transmitted to a comparator 24. The comparator 21 compares the amplitude data A and B and, when the result of comparison is A=B or A>B, it transmits a predetermined signal, such as a high level or "H", to the decoder 25. The comparators 22, 23 and 24 each transmit a predetermined signal, such as a high level or "H" signal, to the decoder 25 when the results of comparison of the amplitude data B-C, B-D and A-D are B=C, B=D or B>D, and A=D or A>D, respectively. The decoder 25 then transmits a signal, such as a high level or "H" signal to an input terminal of AND gate 36.

Also, the above mentioned amplitude data are input to and converted by a binary circuit 26, timed by reference clocks from terminal 3, into bit data, which are transmitted to a shift register 34. The reference clocks are also supplied from input terminal 3 to the shift register 34, and a signal X produced by shifting the output of the binary circuit 26 on the basis of the reference clocks is transmitted to a comparator 35. A bit data pattern Y of "10010010010" is supplied to the comparator 35, which transmits a signal, such as a high level or "H" signal, when X=Y="10010010010", to the input terminal of the AND circuit 36.

When the output signal from the comparator 35 is "H" and the output signal from the decoder 25 is also "H", AND gate 36 uses these signals as input and detects that the pit pattern of the reproduced signal matches the pit pattern of the sector mark.

The binary circuit 26 in FIG. 11 may be replaced by the differentiating circuit 62 and the comparator 63 described with reference to FIG. 8. In such case, it is the reproduced signal, rather than the output of the A/D converter 2, that is supplied to the differentiating circuit 62 and the comparator 63.

If the circuit of the above described second embodiment is used, the tracking servo byte adjacent to the sector mark may also be detected in each sector.

What is claimed is:

1. An apparatus for detecting the presence of a tracking error detecting pit pattern in a reproduced signal reproduced from a record disk having tracking error detecting pits recorded thereon and being offset a predetermined distance with respect to the center of a recording track, said apparatus comprising:
   bit data pattern detection means for detecting a characteristic bit data pattern in said reproduced signal and providing a bit pattern signal;
   amplitude pattern detection means for detecting a characteristic amplitude pattern in said reproduced signal and providing an amplitude pattern signal; and
   pit pattern discriminating means for detecting said presence of said tracking error detecting pit pattern on the basis of said bit pattern signal and said amplitude pattern signal.

2. The apparatus according to claim 1; wherein said amplitude pattern detection means includes means for digitizing said reproduced signal, and means to take out and compare a plurality of amplitude data of the digitized reproduced signal on the basis of reference clocks to detect if these data are predetermined amplitude data; and wherein said bit data pattern detection means includes means to convert said reproduced signal into a bit data pattern and to compare said bit data pattern with a predetermined reference bit data pattern to detect if the reproduced signal includes the predetermined bit data pattern.

3. The apparatus according to claim 2; wherein said means for taking out amplitudes data from the digitized reproduced signal on the basis of reference clocks includes a plurality of registers, and said means for comparing the amplitude data includes comparators receiving the data taken out by said registers and decoding means supplied with comparison outputs from said comparators.

4. An apparatus for detecting the presence of a sector mark in a reproduced signal reproduced from a record disk, said sector mark being formed by pits recorded on said record disk and being offset a predetermined distance with respect to the center of a recording track, said apparatus comprising:
   bit data pattern detection means for detecting a characteristic bit data pattern in said reproduced signal and providing a bit pattern signal,
   amplitude pattern detection means for detecting a characteristic amplitude pattern in said reproduced signal and providing an amplitude pattern signal,
   pit pattern discriminating means for detecting said presence of said sector mark pit pattern on the basis of said bit pattern signal and said amplitude pattern signal.

5. The apparatus according to claim 4; wherein said amplitude pattern detection means includes means for digitizing said reproduced signal, and means to take out and compare a plurality of amplitude data of the digitized reproduced signal on the basis of reference clocks to detect if these data are predetermined amplitude data; and wherein said bit data pattern detection means includes means to convert said reproduced signal into a bit data pattern and to compare said bit data pattern with a predetermined reference bit data pattern to detect if the reproduced signal includes the predetermined bit data pattern.

6. The apparatus according to claim 5, wherein said means for taking out amplitude data from the digitized reproduced signal on the basis of reference clocks includes a plurality of registers, and said means for comparing the amplitude data includes comparators receiving the data taken out by said registers, and decoding means supplied with comparison outputs from said comparators.

7. A method for detecting a predetermined pit pattern on a record disk which has been recorded with pits in said predetermined pit pattern offset a predetermined distance with respect to the center of a recording track; comprising the steps of: detecting whether a reproduced signal reproduced from said record disk contains an amplitude pattern which matches an amplitude pattern corresponding to the predetermined pit pattern, detecting whether said reproduced signal contains a bit data pattern which matches a bit data pattern corresponding to said predetermined pit pattern, and determining that said reproduced signal includes said predetermined pit pattern in response to the simultaneous detection of said amplitude pattern and said bit data pattern.

8. The method according to claim 7 wherein said predetermined pit pattern is a tracking error detecting pit pattern.

9. The method according to claim 7 wherein said predetermined pit pattern is a sector mark detecting pit pattern.

10. A reproducing apparatus for use with an optical disk having recorded thereon a tracking error detecting pit pattern constituted by tracking error detecting pits offset a predetermined distance with respect to the center of a recording track, said apparatus comprising:

- an optical head for reproducing a signal recorded as pits along said recording track and supplying a reproduced signal,
- bit data pattern detection means for detecting a characteristic bit data pattern in said reproduced signal and providing a bit pattern signal,
- amplitude pattern detection means for detecting a characteristic amplitude pattern in said reproduced signal and providing an amplitude pattern signal, and
- pit pattern discriminating means for detecting said presence of said tracking error detecting pit pattern on the basis of said bit pattern signal said amplitude pattern signal.

11. The apparatus according to claim 10; wherein said amplitude pattern detection means includes means for digitizing said reproduced signal, and means to take out and compare a plurality of amplitude data of the digitized reproduced signal on the basis of reference clocks to detect if these data are predetermined amplitude data; and wherein said bit data pattern detection means includes means to convert said reproduced signal into a bit data pattern and to compare said bit data pattern with a predetermined reference bit data pattern to detect if the reproduced signal includes the predetermined bit data pattern.

12. A reproducing apparatus for use with an optical disk having recorded thereon a sector mark pit pattern constituted by sector mark detecting pits offset a predetermined distance with respect to the center of a recording track, said apparatus comprising:

- an optical head for reproducing a signal recorded as pits along said recording track and supplying a reproduced signal,
- bit data pattern detection means for detecting a characteristic bit data pattern in said reproduced signal and providing a bit pattern signal,
- amplitude pattern detection means for detecting a characteristic amplitude pattern in said reproduced signal and providing an amplitude pattern signal, and
- pit pattern discriminating means for detecting said presence of said sector mark pit pattern on the basis of said bit pattern signal and said amplitude pattern signal.

13. The apparatus according to claim 12; wherein said amplitude pattern detection means includes means for digitizing said reproducing signal, and means to take out and compare a plurality of amplitude data of the digitized reproduced signal on the basis of reference clocks to detect if these data are predetermined amplitude data; and wherein said bit data pattern detection means includes means to convert said reproduced signal into a bit data pattern and to compare said bit data pattern with a predetermined reference bit data pattern to detect if the reproduced signal includes the predetermined bit data pattern.

* * * * *